United States Patent Office 2,813,796
Patented Nov. 19, 1957

2,813,796

PROCESS FOR PRODUCING A QUICK-COOKING PRODUCT OF RICE OR OTHER STARCHY VEGETABLE

Kenneth K. Keneaster, Houston, Tex., and Harrison E. Newlin, Prairie Village, Kans., assignors to Converted Rice, Inc., Houston, Tex., a corporation of Delaware No Drawing. Application September 20, 1954, Serial No. 457,312

11 Claims. (Cl. 99—80)

Our invention relates to a method of producing a quick-cooking product of rice or other starchy vegetable. This application is a continuation-in-part of application Serial No. 279,244, filed March 28, 1952.

An object of our invention is to provide a new and improved process for producing a quick-cooking rice product having the following characteristics:

(1) The finished product before re-cooking resembles whole-grain rice with well-rounded and substantially unbroken kernels of a good, clear, white color;

(2) The product can be re-cooked in five minutes or less by using a simple and conventional cooking procedure.

(3) When re-cooked and presented at the table, the product resembles whole-grain rice of good quality with the individual grains large, distinct, and very well-rounded and of an even, light, and fluffy texture.

(4) The re-cooked rice has the appearance and flavor of rice which has not been treated by our process.

Another object of our invention is to provide a new and improved process which is not limited to rice but may be applied to other starchy vegetables.

Another object of our invention is to provide a new and improved process for producing a quick-cooking product having good keeping qualities.

Another object of our invention is to provide a new and improved process which requires no new or special equipment but which can be carried out by the utilization of equipment now readily available.

Another object of our invention is to provide a new and improved process which is simple and inexpensive and equally adapted for treating large and small quantities of a given vegetable.

Other objects and advantages will become apparent as the description proceeds.

In general our novel process comprehends the following steps:

(1) Steeping in water to a point approaching saturation;
(2) Cooking in water;
(3) Separating the vegetable from the cooking water;
(4) Cooling;
(5) Freezing;
(6) Thawing;
(7) Drying;

While the process is applicable generally to starchy vegetables, such as cereals, potatoes, peas, beans, macaroni, spaghetti, etc., we shall for purposes of illustration describe a specific example in which our process was utilized to prepare a quick-cooking rice.

A batch of whole-grain or head rice was first steeped to a point approaching saturation by holding the rice under water for a period of sixteen hours, with the water temperature at about 80° F. The rice used in this example had previously been treated by the process described in United States Patent No. 2,358,251 and had a moisture content of from 10% to 12% by weight at the start of the steeping step.

After steeping, the rice was cooked in water, with one gallon of water being used for each pound of rice. The mixture of water and rice was first warmed to a temperature of 95° C. during a period of twenty minutes and then cooked at a gentle boil for a period of thirty-six minutes with the temperature of the cooking water varying from 96° C. to 101° C. and being predominantly between 98° C. and 99° C. The cooking was stopped abruptly to avoid overcooking and uneven cooking, the cooking water being drained from the rice over a period of 1¼ minutes. The rice was then divided into quantities not exceeding a pound each, and each of these quantities placed in a sealed jar. The sealed jars were then put in ordinary mechanical refrigerators having a temperature of approximately 37° F., care being taken that only a few jars were placed in each refrigerator, so that the cooling capacities of the household refrigerators used were not overloaded. The sealed jars of rice were left in the refrigerators until cooled to about 37° F.

The jars were removed from the refrigerators, wrapped in insulating material, and placed in a freezing unit having a temperature of −18° C. The freezing unit used was of the so-called deep-freeze type commonly used in homes and stores. The insulation about the jars delayed the loss of heat so that it took approximately one hour to cool the rice to freezing temperature, another two hours to freeze it, and another hour to reduce the temperature of the rice to approximately 18° below zero centigrade. At the end of the four hours, the jars were removed from the freezing unit and the rice permitted to thaw at room temperature. During this thawing operation, the covers were kept on the jars to prevent evaporation of moisture or drying of the rice during the thawing operation, but the wrapping around the jars was removed to facilitate thawing. The rice was then removed from the jars, spread out, and dried in a strong current of dry, hot air, whose temperature was not permitted to exceed 105° F. The drying was continued until the rice had a moisture content of less than 6%, and this drying operation was completed in approximately six hours.

At the conclusion of the drying operation the kernels were well-rounded, substantially unbroken, and had a good, clear, white color. The kernels resembled ordinary cooked white rice which had not been treated either by our process or the process of said Patent No. 2,358,251. A part of this batch was then re-cooked by placing a cupful in three cups of water and bringing to a boil on an ordinary stove. As soon as the water came to a boil, the excess water was drained off and the rice was ready for eating. This re-cooking required less than five minutes, and produced a product in which the individual grains were large, distinct, and very well rounded, and had an even, light, and fluffy texture. In color, flavor, and all other respects, this product resembled ordinary white rice of good quality.

Some of the kernels produced by our process in this example were not immediately re-cooked but were kept in containers at room temperature for a period of four months. Upon inspection at the end of this period, the kernels showed no deterioration and when re-cooked in the manner previously described, gave the same results as those kernels which were re-cooked shortly after the completion of the drying operation.

Several specific examples are given herein of steeping times and temperatures which may be employed to give good results. It will be understood that various other steeping times and various other temperatures may be employed, the steeping time varying inversely with the temperature. The important consideration in this respect is that the temperature of the steeping water should be maintained below the point where gelatinization of the starch of the vegetable being steeped occurs, and for the particular temperature chosen the steeping period should be long enough so that the vegetable is completely wetted throughout. This does not necessarily mean that that the vegetable is completely saturated and cannot take up more water, but the complete wetting through to the center generally occurs as the vegetable is approaching saturation. In most cases, and particularly with rice, the vegetable is satisfactorily steeped when it has been wetted through to its center, and this can be determined by visual inspection of a grain of rice which has been broken apart transversely. In other specific applications of the process, the rice was steeped respectively, for a period of four hours in water at a temperature of about 120° F.; for a period of three-quarters hour at 140° F.; and for one and one-half hours at 120° F., and in each case satisfactory results were obtained. It will be understood, of course, that the steeping time and temperature of the steeping water will vary to some extent according to the nature of the rice employed as a starting material and also according to the initial moisture content of the rice, which may vary between 9 and 15 percent. The steeping period can also be shortened by applying pressure, but the pressure applied should not be great enough to disrupt the cells, and for rice should not exceed approximately 100 pounds p. s. i. The steeping operation can also be facilitated by initially subjecting the rice or other vegetable to a vacuum to remove air therefrom before the commencement of the steeping operation.

In the cooking step it is important that the rice or other vegetable be neither overcooked nor undercooked. If the vegetable is overcooked in carrying out our process, it will be too soft when placed upon the table, and if undercooked in carrying out our process, it will not recook as rapidly as desired. The cooking time will vary with the temperature, as indicated by the following chart:

| Cooking Temperature Range, °C. | Number of Minutes of Cooking Required for Rice |
| --- | --- |
| 93.0–97.0 | 48–60 |
| 97.0–100.5 | 34–38 |
| 118.0–119.0 | 12–15 |
| 125.0–125.5 | 12–15 |

Generally speaking, our experience has shown that in preparing rice the cooking time should be accurate within approximately one minute when a high temperature is used, and within approximately fifteen minutes when a low temperature is used. The proper cooking time depends to some extent upon the percentage of moisture which the rice will absorb without swelling to the point at which it becomes ragged. We have found that ordinary dried white milled rice must be cooked for a shorter time than rice which has been treated by the process described in the United States Patent No. 2,358,251, as it stands less swelling before becoming ragged. A relatively smooth surface is desired on the cooked rice particles in order to avoid diminishing the yield of the process as a result of abrasion and fracture of the particles caused by a ragged surface during the subsequent processing.

In the specific example given above, we described the rice as being cooled by placing it in sealed jars in a refrigerator. The same result can be accomplished by pouring the rice into cold water which may then be drained for several minutes and under conditions which avoid drying the rice during draining. This latter method of cooling is particularly applicable where large quantities are to be cooled, although the refrigerator method may also be used for large quantities provided the necessary refrigerating capacity is available. The method of cooling is not critical and other methods can be utilized, but care should be taken to avoid drying during the cooling operation.

In the freezing step, it is important that the actual freezing takes place over a relatively long period of time and that the vegetable is not supercooled prior to the transition to the frozen state. In other words, a cooling curve in which temperature is plotted against time in the freezer would show an initial relatively steep slope followed by a nearly flat stretch or plateau during actual change to a frozen state, and when all of the vegetable has been frozen, the temperature again drops rapidly, finally reaching that of the freezer. For rice, the freezing plateau should cover at least an hour, and better results were had when this plateau extended over a period of three hours.

In the preceding example, we wrapped the containers with insulating material to slow down the rate of heat transfer in the freezer. The same result was accomplished in another performance of our process by utilizing a freezer having a low ultimate temperature of −20° C. or even colder, but with a small heat transfer capacity in comparison with the size of the rice batch. In this case it was not necessary to use insulating material, but in this and all other cases the vegetable must be covered to avoid drying during the freezing step. Excellent results are obtained when the rice to be frozen is placed in aluminum trays, for example, of a size about 24″ x 12″ x ⅝″, and covered with aluminum foil crimped to the edges of the tray to effectively seal the rice against the loss of moisture during the freezing step. It will be understood that other types of containers may be used for the rice during the freezing step, but that for purposes of economy the containers should preferably be designed so that rapid heat transfer between rice and the ambient freezing medium can be attained.

During the slow transition to the frozen state, large ice crystals are formed which break down the continuous colloidal starchy structure and produce a porous kernel which readily absorbs water during the re-cooking step. We have found that the water in the rice freezes at between 31° and 32° F., and that the desired result is not obtained where the rice is reduced to a lower temperature than this before freezing takes place. Experience indicates that such supercooling is avoided by quickly reducing the temperature of the rice down to this freezing temperature in the initial part of the freezing operation. Thereafter, as previously pointed out, the rice remains at its freezing temperature while it is slowly transformed to the frozen state, whereupon a further quick drop in temperature takes place. It is not necessary that this latter drop in temperature be carried to any predetermined point, but it should be sufficient to insure complete freezing of all of the moisture in the vegetable. If desired, the vegetable may be retained almost indefinitely in the frozen state, but for most purposes, it is more desirable to have the thawing step immediately follow the freezing step.

The thawing operation is not critical if carried out at room temperature or in warm air over a period of several hours, generally five or more. In the case of rice, it is important to prevent drying during this thawing operation in order to prevent the individual grains from sticking together, and to obtain the desired characteristics and appearance in the final product, but with vegetables which have no tendency to stick together, there is no reason why drying should not be permitted during this thawing operation. The drying operation must be carried out at such a rate as to prevent spoilage, and for rice this rate is such that the total drying time should not exceed 8 hours. The temperature of the drying air must be kept below the point at which destruction of the quality of the rice will occur. The temperature at which this will occur depends to a large extent on the conditions under which the thawing operation has been conducted, and where the thawing has been conducted at room temperature over a period of several hours, drying in warm air of about 110° F. should continue for a period of not less than about 3½ hours for rice, as otherwise the kernel will become checked and therefore less attractive. Different considerations apply where accelerated thawing and drying is done, and it has been found that in order to avoid vitrified rice particles in the final product, it is necessary to carefully control the temperature and humidity conditions during thawing, especially when subsequent accelerated drying is accomplished by air at temperatures ranging up to 250° F.

Further specific examples of the application of the process to starchy vegetables are set forth below:

Commercially dried white milled rice was steeped for two hours in water at 120° F., after which time the steeping water was raised to boiling temperature and the rice allowed to cook in the boiling water for 10 minutes. The moisture content of the rice at this time was in the neighborhood of 70%, this being below the point at which a ragged surface would be caused to appear. The rice was then discharged from the cooking vessel and quickly drenched in cool water in order to prevent further self-cooking. After the rice was drained of excess water, it was placed in aluminum trays in layers of about ⅝" depth, and then covered with an aluminum foil which was crimped to the sides of the tray to provide a substantially moisture-proof container for the rice. The trays were then placed in a freezing compartment in which the ambient temperature was maintained at about minus 12° C. The rice was allowed to remain in the freezing compartment until the temperature of the rice itself had dropped to about 32° F. and had remained at this temperature steadily for about 3 hours. At the end of this time, the temperature of the rice dropped off, indicating that freezing in the temperature plateau had been completed. The block of frozen rice was then removed from the tray and placed upon a steel mesh belt which carried it through a thawing zone in which air at about 85° F. was directed through the rice. The thawing by the forced blast of air was continued for about 30 minutes, after which the thawed rice was placed on a belt which carried it through a drying chamber in which air initially at a temperature of about 230° F. was directed on it for about 2 hours. The drying operation reduced the moisture in the rice to about 8 percent and the finished product resembled whole grain rice with well-rounded and unbroken kernels of a good, clear, white color. A portion of the product was placed with water in a cooking vessel and the water brought to a boil in about 5 minutes. The rice was then removed, ready for consumption. The cooked rice had the appearance and flavor of properly cooked white milled rice with no trace of a starchy or chalky taste frequently found in quick-cooking rice products. The other portion of the product was stored for a period of time in its dried condition and then cooked for consumption as described above. Its characteristics of taste, flavor and form were equally favorable, with the individual grains being large, distinct, well-rounded and of a uniform light and fluffy texture.

A common commercial variety of dried navy beans was steeped in water at 180° F. for about 3 hours, at the end of which time it was found by visual inspection that a representative sample of the beans had been wetted through to their centers. The steeping water was then raised to a boil, and the beans were boiled for about one hour. Thereafter the beans were discharged from the cooking vessel and drained of excess water. They were then placed in shallow aluminum trays and covered with aluminum foil crimped to the sides of the trays to provide a substantially moisture-proof container. The trays were then placed in a freezing compartment in which the ambient temperature was maintained at minus 15° C. The temperature of the beans was observed by remote indicators, and it was found that after the temperature of the beans had dropped to about 32° F. and had remained at this temperature for about 4 hours, a further drop, to below the freezing temperature occurred, indicating that the freezing, for purposes of this process, had been completed. The block of frozen beans was then removed from the tray and thawed by a blast of air at about 90° F. After the beans were thawed, they were subjected to a blast of drying air maintained at about 180° F. until moisture content of the beans dropped to about 6%.

It was found that the beans processed in this manner could be cooked into a palatable state in about 10 minutes, as compared with the cooking of 3 to 4 hours generally required for commercial dried beans.

A commercial variety of sea-shell macaroni was steeped in water at a temperature of about 85° F. for 2 hours, after which the steeping water was heated to a boil. The macaroni was allowed to cook in the boiling water for 15 minutes, after which it was removed and drained of excess water. The macaroni was then placed in flat aluminum trays and covered with aluminum foil, which was crimped to the sides of the trays to prevent moisture loss during the freezing operation. The macaroni was placed in a freezing compartment in which the ambient temperature was maintained at about minus 18° C. After a period of cooling, the macaroni dropped to a temperature of about 32° F., and remained at this temperature for approximately 3 hours. At the end of this time, a further temperature drop was observed, indicating that the freezing operation had been completed. The block of frozen macaroni was then removed from the freezing compartment and subjected to thawing by a stream of air at about 90° F. for approximately 20 minutes. The macaroni was thereafter subjected to drying air at a temperature of about 200° F. until the moisture content had been reduced to that of the starting material macaroni. The form and appearance of the processed macaroni product was substantially identical to the original. It was found that the cooking time of the processed macaroni, in boiling water, was about 5 to 7 minutes as compared to 15 to 18 minutes required for satisfactorily cooking a starting material macaroni.

In a modified form of our process, the steeping step can be eliminated and the rice or other vegetable cooked without any preliminary steeping. Under such circumstances the cooking step must be continued from 10% to 25% longer than where a preliminary steeping is used, the variation in the longer cooking time being due somewhat to the variations in the moisture content of the rice or other vegetable prior to cooking. In all other respects, this modified form of our process may be the same as that previously described. The quality of the product produced by this modified form of our process is not as high as that resulting from the preferred form, but is sufficiently good to suffice for many purposes.

It is to be understood that our invention is not limited to the details described but may assume various other forms and includes all modifications, variations, and equivalents coming within the scope of the appended claims.

Having thus described the invention, what is claimed as new and desired to be secured by Letters Patent is:

1. That process of treating rice and other starchy vegetables to produce a quick-cooking product which can be quickly re-cooked to correspond in taste and appearance to ordinary cooked vegetables, comprising steeping the vegetable under water for a period of several hours until the vegetable is approximately saturated with water, cooking the vegetable under water, abruptly terminating the cooking by separating the vegetable from the cooking water, cooling the vegetable under non-drying conditions, freezing the vegetable by producing a rapid temperature drop to the freezing temperature of about 31°–32° F., maintaining said freezing temperature for a period of at least an hour and thereafter producing a second rapid temperature drop, thawing the vegetable under non-drying conditions, and drying the vegetable without changing its appearance or flavor.

2. That process of treating rice to produce a quick-cooking whole grain product which comprises steeping the rice under water for a period of several hours until the rice is approximately saturated with water, cooking the rice under water, abruptly terminating the cooking by separating the rice from the cooking water, cooling the rice under non-drying conditions, freezing the rice by producing a rapid temperature drop to the freezing temperature of about 31°–32°F., maintaining said freezing temperature for a period of at least an hour and thereafter producing a second rapid temperature drop, thawing the rice under non-drying conditions, and drying the rice at a temperature less than 110° F. until the moisture content is approximately six per cent by weight.

3. That process of treating rice and other starchy vegetables to produce a quick-cooking product having the appearance of a vegetable cooked in the ordinary way, said process comprising the steps of completely cooking the vegetable under water, abruptly terminating the cooking by separating the vegetable from the cooking water, cooling the vegetable under non-drying conditions, freezing the vegetable by producing a rapid temperature drop to the freezing temperature of about 31–32° F., maintaining said freezing temperature for a period of at least an hour and thereafter producing a second rapid temperature drop, thawing the vegetable under non-drying conditions, and drying the vegetable in warm air.

4. That process of treating rice to produce a quick-cooking whole grain product comprising completely cooking the rice under water, separating the rice from the cooking water, cooling the rice to a point several degrees above freezing under non-drying conditions, rapidly reducing the temperature of the rice to the temperature of about 31°–32° F. at which the moisture in the rice will freeze, maintaining such freezing temperature for at least an hour until all of the moisture in the rice has been converted into large ice crystals, rapidly reducing the temperature of the frozen rice several degrees below its freezing temperature, thawing the rice under non-drying conditions, and drying the rice under conditions which will eliminate cracking and spoiling of the rice kernels.

5. That process of treating starchy vegetables to produce a quick-cooking product having its original shape and flavor comprising completely cooking the vegetable in water, separating the vegetable from the cooking water, cooling the vegetable, rapidly dropping the temperature of the cooled vegetable to the temperature of about 31°–32° F. at which the moisture therein will freeze, maintaining the vegetable at such freezing temperature for a period of time of at least an hour sufficient to permit the formation of large ice crystals therein, thawing the vegetable, and drying the vegetable.

6. That process of treating rice and other starchy vegetables to produce a quick-cooking product comprising completely cooking the vegetable in water, separating the vegetable from the cooking water, cooling the vegetable, rapidly dropping the temperature of the cooled vegetable to the temperature of about 31°–32° F. at which the moisture therein will freeze, maintaining the vegetable at such freezing temperature for a period of time of at least an hour sufficient to permit the formation of large ice crystals therein, thawing the vegetable, and drying the vegetable to a less than normal moisture content.

7. That process of treating rice to produce a quick-cooking whole grain product comprising completely cooking the rice in water, separating the rice from the cooking water, cooling, the rice, rapidly dropping the temperature of the cooled rice to approximately thirty-one and one-half degrees Fahrenheit, maintaining the vegetable at such freezing temperature for a period of time of at least an hour sufficient to permit the formation of large ice crystals therein, thawing the vegetable, and drying the vegetable to a less than normal moisture content.

8. That process of treating rice to produce a quick-cooking product comprising completely cooking the rice, cooling the rice to a point several degrees above freezing under non-drying conditions, rapidly reducing the temperature of the rice to the temperature of about 31°–32° F. at which the moisture in the rice will freeze, maintaining such freezing temperature for at least an hour until all of the moisture in the rice has been converted into large ice crystals, rapidly reducing the temperature of the frozen rice several degrees below its freezing temperature, thawing the rice under non-drying conditions, and drying the rice under conditions which will eliminate cracking and spoiling of the rice kernels.

9. In a process for preparing a quick-cooking, whole-grain rice product wherein the rice is saturated with water, precooked, slowly frozen, thawed and dehydrated, the steps of accomplishing the freezing by maintaining the rice, without super-cooling, at the maximum constant temperature at which the water within the rice will freeze for a period of at least one hour and until the said water is frozen, and retarding of the loss of water content of the rice during freezing.

10. In a process for preparing a quick-cooking, whole-grain rice product wherein the rice is saturated with water, precooked, slowly frozen, thawed and dehydrated, the steps of accomplishing the freezing by maintaining the rice, without super-cooling, at the maximum constant temperature at which the water within the rice will freeze for a period of about three hours and until the said water is frozen, and retarding of the loss of water content of the rice during freezing.

11. In a process for preparing a quick-cooking whole-grain rice product wherein the rice is saturated with water, precooked, slowly frozen, thawed and dehydrated, the steps of accomplishing the freezing by placing the rice in a substantially sealed container to retard loss of moisture content of the rice during freezing, and maintaining the rice, without super-cooling, at the maximum constant temperature at which the water within the rice will freeze for a period of at least one hour and until the said water is frozen.

References Cited in the file of this patent

UNITED STATES PATENTS

| Number | Name | Date |
|---|---|---|
| 2,021,721 | Gibbon | Nov. 19, 1935 |
| 2,278,472 | Musher | Apr. 7, 1942 |
| 2,358,251 | Huzenlaub | Sept. 12, 1944 |
| 2,438,939 | Ozai-Durrani | Apr. 6, 1948 |